United States Patent
Youngquist

(10) Patent No.: US 10,269,256 B2
(45) Date of Patent: Apr. 23, 2019

(54) AIRCRAFT LANDING AID WITH RANGEFINDER

(71) Applicant: John S. Youngquist, Niagara Falls (CA)

(72) Inventor: John S. Youngquist, Niagara Falls (CA)

(*) Notice: Subject to any disclaimer, the term of this patent is extended or adjusted under 35 U.S.C. 154(b) by 0 days.

(21) Appl. No.: 15/220,971

(22) Filed: Jul. 27, 2016

(65) Prior Publication Data

US 2018/0033316 A1 Feb. 1, 2018

(51) Int. Cl.
| | |
|---|---|
| *G05D 1/06* | (2006.01) |
| *G08G 5/02* | (2006.01) |
| *B64D 45/08* | (2006.01) |
| *G01S 17/02* | (2006.01) |
| *G01S 17/10* | (2006.01) |
| *G01S 17/32* | (2006.01) |
| *G01S 17/93* | (2006.01) |
| *G01S 7/481* | (2006.01) |

(52) U.S. Cl.
CPC ............ *G08G 5/025* (2013.01); *B64D 45/08* (2013.01); *G01S 7/4813* (2013.01); *G01S 17/023* (2013.01); *G01S 17/10* (2013.01); *G01S 17/32* (2013.01); *G01S 17/933* (2013.01)

(58) Field of Classification Search
USPC ............ 73/178 T; 701/4, 5, 14, 16; 244/183, 244/186, 187; 356/4.01
See application file for complete search history.

(56) References Cited

U.S. PATENT DOCUMENTS

| | | | |
|---|---|---|---|
| 1,468,018 A | 9/1923 | Gerhardt | |
| 2,216,716 A | 10/1940 | Withem | |
| 2,316,751 A | 4/1943 | Adler, Jr. | |
| 2,358,794 A | 9/1944 | Dalton | |
| 3,400,581 A * | 9/1968 | Bostwick | G01P 1/10 116/303 |
| 3,549,256 A | 12/1970 | Brienza et al. | |
| 3,603,683 A | 9/1971 | Paine et al. | |
| 3,669,540 A | 6/1972 | Rattman et al. | |
| 4,195,425 A | 4/1980 | Leitz et al. | |
| 4,938,440 A | 7/1990 | Weinfield | |
| 4,979,154 A * | 12/1990 | Brodeur | G01S 7/521 367/116 |
| 5,577,697 A | 11/1996 | Accordino | |
| 5,719,581 A * | 2/1998 | Poe | G01C 5/005 342/120 |
| 6,042,080 A | 3/2000 | Shepherd et al. | |
| 6,267,487 B1 | 7/2001 | Tucker et al. | |

(Continued)

*Primary Examiner* — Brent Swarthout
(74) *Attorney, Agent, or Firm* — Nixon & Vanderhye P.C.

(57) ABSTRACT

A landing aid is removably attachable to an aircraft to provide precise measurements of distance and descent rate to ground which are conveyed to the pilot in real time via sound such that the pilot does not have to look away from the flight path ahead during the landing process. The landing aid may generate energy waves that pass from an interior portion of the aircraft to an area exterior of the aircraft through a window of the aircraft. A reflector may be positioned on an exterior portion of the aircraft to direct the energy waves toward the ground. The energy waves reflected back towards the aircraft by the ground permit a distance from the aircraft to the ground and a descent rate to be determined and concurrently output to a pilot via audible signals.

26 Claims, 8 Drawing Sheets

(56) References Cited

U.S. PATENT DOCUMENTS

| | | | |
|---|---|---|---|
| 9,091,538 B2 * | 7/2015 | Zhang | 244/183 |
| 2010/0276555 A1 | 11/2010 | Steffen et al. | |
| 2013/0313388 A1 | 11/2013 | Diatzikis et al. | |
| 2016/0041561 A1 * | 2/2016 | Davies | G05D 1/0676 |
| | | | 701/6 |
| 2016/0055687 A1 * | 2/2016 | Blank, Sr. | G07C 5/085 |
| | | | 701/4 |

* cited by examiner

AIRCRAFT LANDING AID WITH RANGEFINDER

TECHNICAL FIELD

The present technology relates generally to aircraft landing aids, and more particularly to a rangefinder causing audio indications of (a) remaining distance to the ground and (b) rate of descent to assist a pilot with landing an aircraft.

BACKGROUND

Some airplane pilots struggle to achieve smooth landings on a consistent basis. Skill, experience, visual perception, fatigue and/or distraction are factors that may play a role in a pilot's ability to land a plane smoothly. Also, landing at night, during a power outage at the airport, when there is a runway lighting issue, or on glassy water may present additional challenges. A good landing is assured if the pilot can touch the runway under control with low vertical velocity.

BRIEF SUMMARY

A lot of senses are at work during the final moments of touchdown. Sensing descent rate possibly must be done mostly with the inner ear, but visual clues and other things may play a role, too. It has long been desired to provide precise altitude and closure rate information to the pilot to make landing easier.

Whatever the solution, if it requires permanent installation, it will be limited to purchase by the airplane owner and will require Supplemental Type Certificate (STC) approval from the Federal Aviation Administration (FAA). The best application for this sort of aid may well be to student or low time pilots. Ideally a device is desired that could be used with any airplane without permanent installation.

A laser range finder will meet these unique requirements; range finders that function using other techniques may work as well (e.g., using sound waves (e.g., ultrasound), electromagnetic waves (e.g., radio waves, visible and invisible light (e.g., LED)), or other propagating energy waves). One can keep it in the airplane and let it see the ground through a window and an external mirror. Hold the two together with some strong magnets and it installs (removably) in a few seconds without modifications or damage to the airplane.

Any device designed to provide landing guidance during the last few feet before touchdown should not distract the pilot with a display. So this one will communicate with sound. During the final stages of landing there are two parameters of primary interest to the pilot—altitude and descent rate. These parameters must be communicated with high resolution and be easy to understand.

There are many possible geometries that achieve a desired easy to removably install configuration. As previously mentioned a laser range finder could be mounted inside the airplane with light (visible or not) waves passing through a window coupled to a 45 degree mirror to direct a light beam to/from the ground. One could also make a mount that replaces the vent window. One could also mount the range finder on the outside and communicate via radio, light beam or with simple transformer induction. The magnets could be replaced with suction cups, glue or double-faced tape. The range finder could be attached to a wing strut or other structure by various means like tie wraps or Velcro® with Bluetooth® or similar radio communication to a receiver located in the airplane. While the magnets and through-the-window configuration seem most practical, possibly less practical workarounds are also useful.

If this device is to be battery powered (e.g., 2×AAA batteries), it would be wise to conserve energy for long battery life. The actual time of use in the last few moments of landing is very short so proper power management could give battery life of a year or more. The processor could run continuously at very low speed and lower power drawing only a few uA. But, the processor could wake up say every 10-20 seconds to run the laser range finder briefly (say 20 ms) to look for the ground. Of course in flight the ground is too far away but during landing the device could "see" the ground from 20-30 feet. If the ground were not detected then the device could go back to sleep. If the ground was detected, say within 20 feet, the device could remain on and active to provide landing guidance. After landing when the distance reads zero for several seconds the device could go back to sleep again. Zero distance would imply the airplane is on the ground and the sleep interval could be extended to a minute or more. If the airplane took off again the distance would read greater than zero or out of range which could trigger a 10-20 second sleep interval again.

One configuration for the device would consist of three parts: a reflector (e.g., a mirror), range finder, and headphone interface box. The mirror and range finder work together affixed by magnets on opposite sides of a window. The headphone interface connects to the range finder with a multi-conductor cable and plugs into the aircraft headphone jack. The headset plugs into the interface box. In this way a laser landing aid device can inject signals into the headset audio path on top of normal headset audio. The headphone interface box could have a volume control/power switch to turn the device on/off but could also be configured to automatically turn off all power if the headset were unplugged.

There is, realistically, little or no time to look away from the landing process to view a display, so the best way to communicate is via audio (e.g., via a headphone). Some aspects of this application could best be served by synthetic voice to communicate things like "battery low" or "ground detected at 18 feet." One could also communicate distance to ground by simple numbers "ten, nine, eight . . . ". Information could be added to the synthetic voice by changing the pitch to indicate urgency of high descent rate or change the duration or rate of speaking to similarly convey urgency or lack thereof. The rate at which the number callouts occur could convey descent rate.

While in the last few moments of landing, the distance to the ground is critically important, so is the descent rate to the runway surface. Low vertical velocity at touch down is of course the key to a smooth landing. One needs to communicate both distance and descent rate.

One method of conveying descent rate is with a pulse rate. High rates of descent indicated by high pulse rate audio signals alert the pilot to slow the descent rate. Distance to the ground could be indicated by pitch (frequency) of audio signals during each pulse. If there are concerns about the pitch discrimination skills of non-musically inclined pilots (e.g., they may not have good capability to remember or judge certain frequencies), a two tone system may be used to overcome this. First a short reference tone of low pitch is played that would represent the touchdown altitude, then a short tone related to current distance to ground is played. This two tone sequence is then alternated at a rate related to descent rate. So, a high descent rate would sound rushed or panicked. As the distance to the ground diminishes, the pitch difference between the reference tone pulses and current distance tone pulses would diminish until they were the same tone frequencies (e.g., tending then to blend together diminishing the apparent pulsing of the audio signals) just prior to touchdown.

One aspect of the disclosed technology relates to a removably attachable landing aid that provides precise measurements of distance to ground and descent rate conveyed to the pilot in real time.

Another aspect of the disclosed technology relates to a landing aid that conveys, via audible sound, measurements of distance to ground and descent rate in a manner that does not require the pilot to look away (e.g., to a display screen) from the flight path ahead during a landing process.

One exemplary landing aid includes a rangefinder configured to be mounted in an interior portion of an aircraft and configured to cause energy waves to propagate in a direction away from the rangefinder. The rangefinder also includes a conventional measurement device to detect the energy waves and measure a distance from the measurement device to wave reflection at the ground. A reflector module is configured to mount on an exterior portion of the aircraft to deflect the energy waves toward the ground, and subsequently, back to the rangefinder once reflected from the ground, during aircraft flight.

Another exemplary landing aid includes a rangefinder removably attached to an inside surface of an aircraft window. A frame structure is removably attached to an exterior surface of the aircraft window such that the rangefinder and the frame structure are directly opposed to one another on opposite sides of the aircraft window. The rangefinder is configured to measure a distance from the rangefinder to the ground during flight of the aircraft.

An exemplary method of assisting a pilot in landing an aircraft may include a step of passing energy waves from an interior portion of an aircraft to an area exterior of the aircraft through a window where the energy waves are deflected by a reflector towards the ground and back towards the aircraft by the ground where the reflected beam is again deflected by the reflector into a distance measuring device. A relative distance from the aircraft to the ground is then conventionally determined and used to drive an audio output including audio indications of aircraft descent rate and remaining distance to the ground.

Other aspects, features, and advantages of the present technology will become apparent from the following detailed description when taken in conjunction with the accompanying drawings, which are a part of this disclosure and which illustrate, by way of example, different aspects of this technology.

BRIEF DESCRIPTION OF THE DRAWINGS

The accompanying drawings facilitate an understanding of various embodiments wherein.

DETAILED DESCRIPTION OF EXEMPLARY EMBODIMENTS

The following description is provided in relation to several examples (most of which are illustrated) which may share some common characteristics and features. It is to be understood that one or more features of any one example may be combinable with one or more features of the other examples. In addition, any single feature or combination of features in any of the examples may constitute additional examples.

Figure 1:
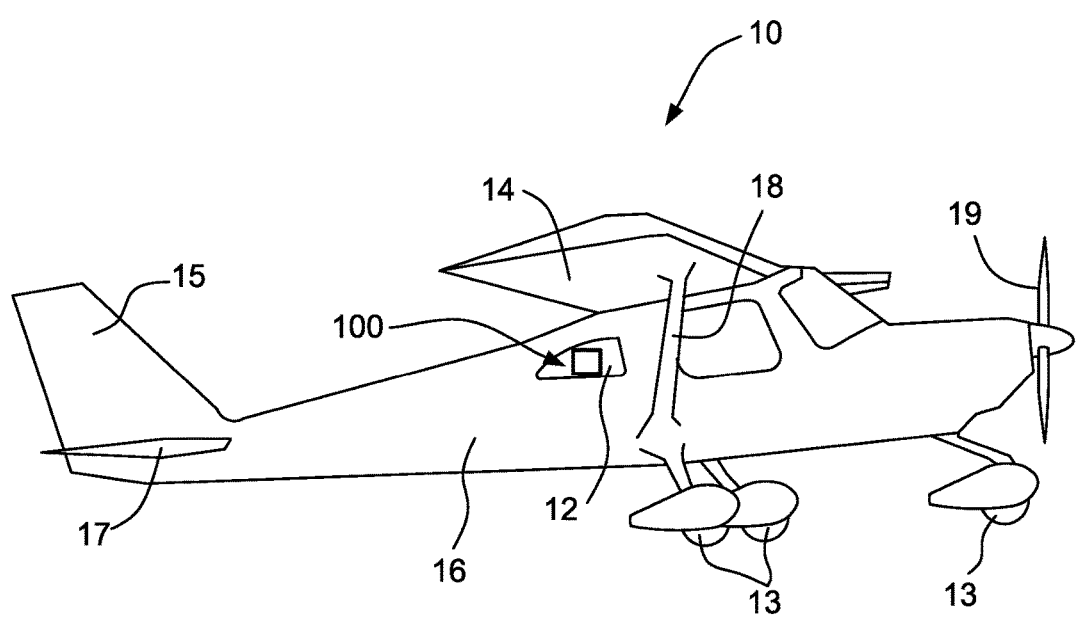
FIG. 1 is a perspective view of an aircraft having positioned thereon a laser landing aid according to an example of the disclosed technology.

Referring to FIG. 1, an example aircraft 10 includes window 12, landing gear 13, wing 14, vertical stabilizer 15, fuselage 16, horizontal stabilizer 17, wing strut 18 and propeller 19. Those skilled in the art will understand that the aircraft includes other conventional components, such as an engine.

Figure 2:
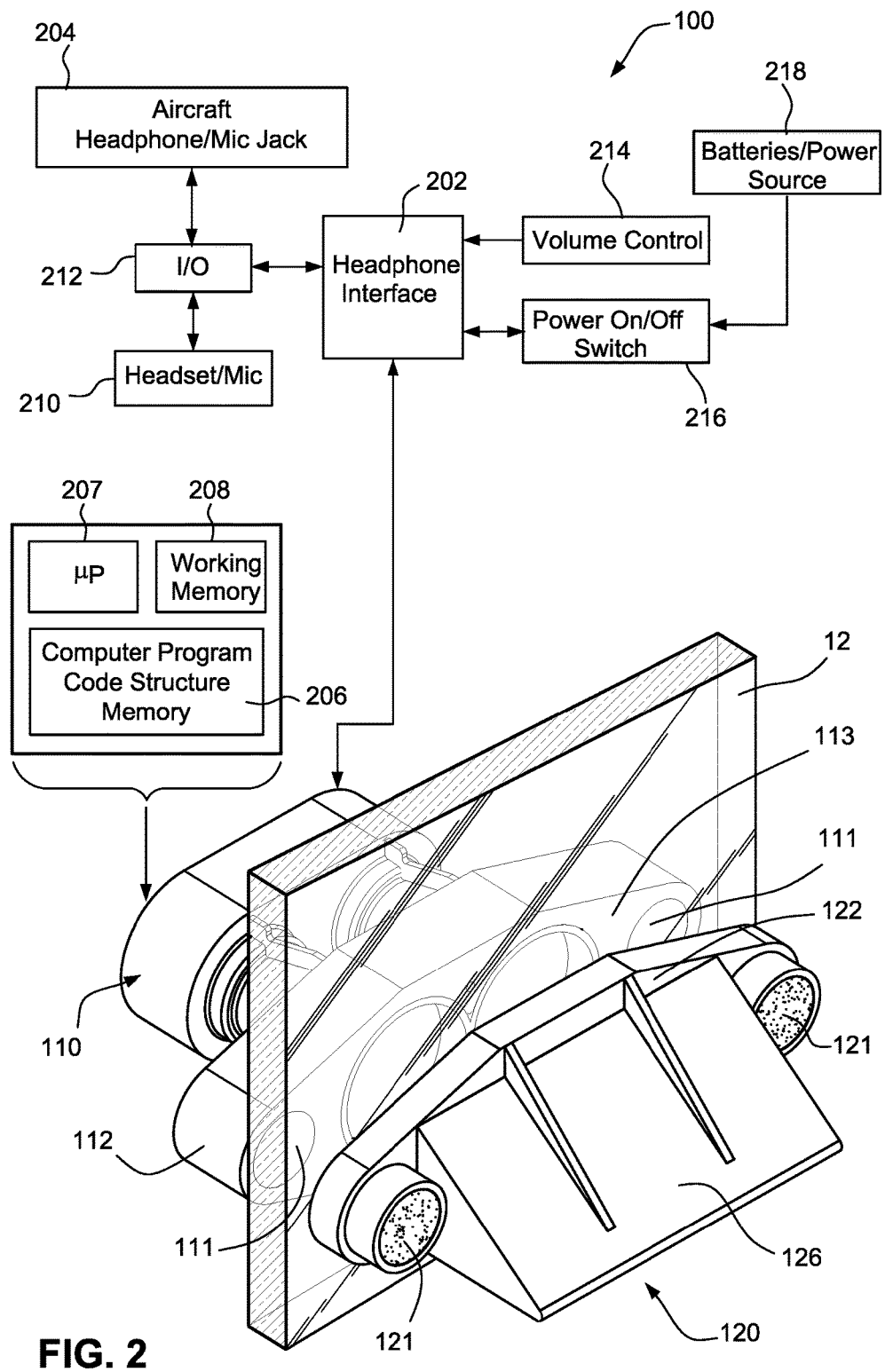
FIG. 2 is a perspective view of an example laser landing aid.

A landing aid 100 is attached to window 12, as shown in FIGS. 1 and 2. Landing aid 100 includes a rangefinder (e.g., laser rangefinder 110) to measure the distance to an object (e.g., the ground) as those skilled in the art will understand (e.g., by determining the time it takes a laser beam pulse to travel to the object and return after being reflected from the object). Instead of using beam pulses to measure the distance to the object, rangefinder 110 could use a frequency-modulated continuous wave, or other forms and/or formats of propagating energy, as those skilled in the art will understand.

Those skilled in the art will also understand that the rangefinder could use techniques other than a laser to measure distance. For example, the rangefinder could use sound waves (e.g., ultrasound), electromagnetic waves (e.g., radio waves, visible and invisible light (e.g., LED)), or other energy waves and be configured to cause the energy waves to propagate in a direction away from the rangefinder and then in a direction reversely directed as a reflection from the ground.

Figure 3:
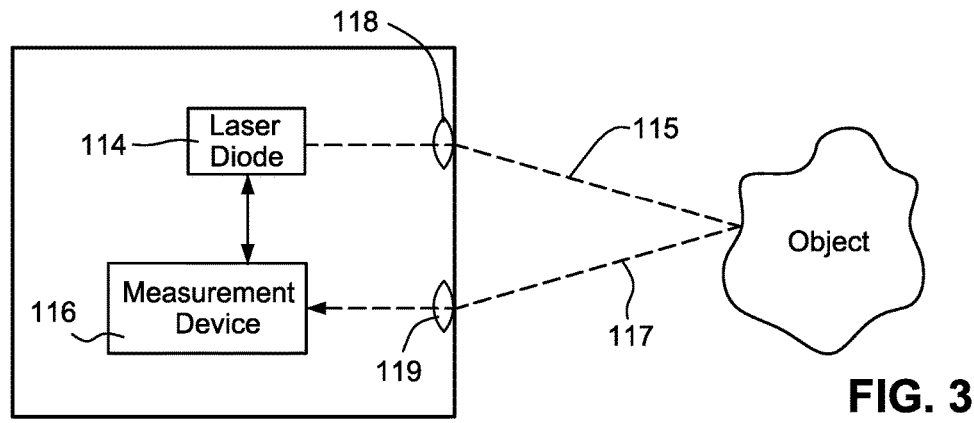
FIG. 3 is a schematic representation of an example laser landing module of the laser landing altimeter of FIG. 2.

Turning to FIG. 3, rangefinder 110 includes a laser source diode 114 generating laser beam 115 which propagates toward an object (e.g., the ground), first passing through lens 118, then reflecting from the object as returning beam 117 passing through lens 119 to a measurement device 116 which calculates the distance to the object. As those in the art will appreciate, the laser source 114 and measurement device 116 may communicate with each other and may conventionally be packaged together as a unitary laser rangefinder device.

Figure 4:
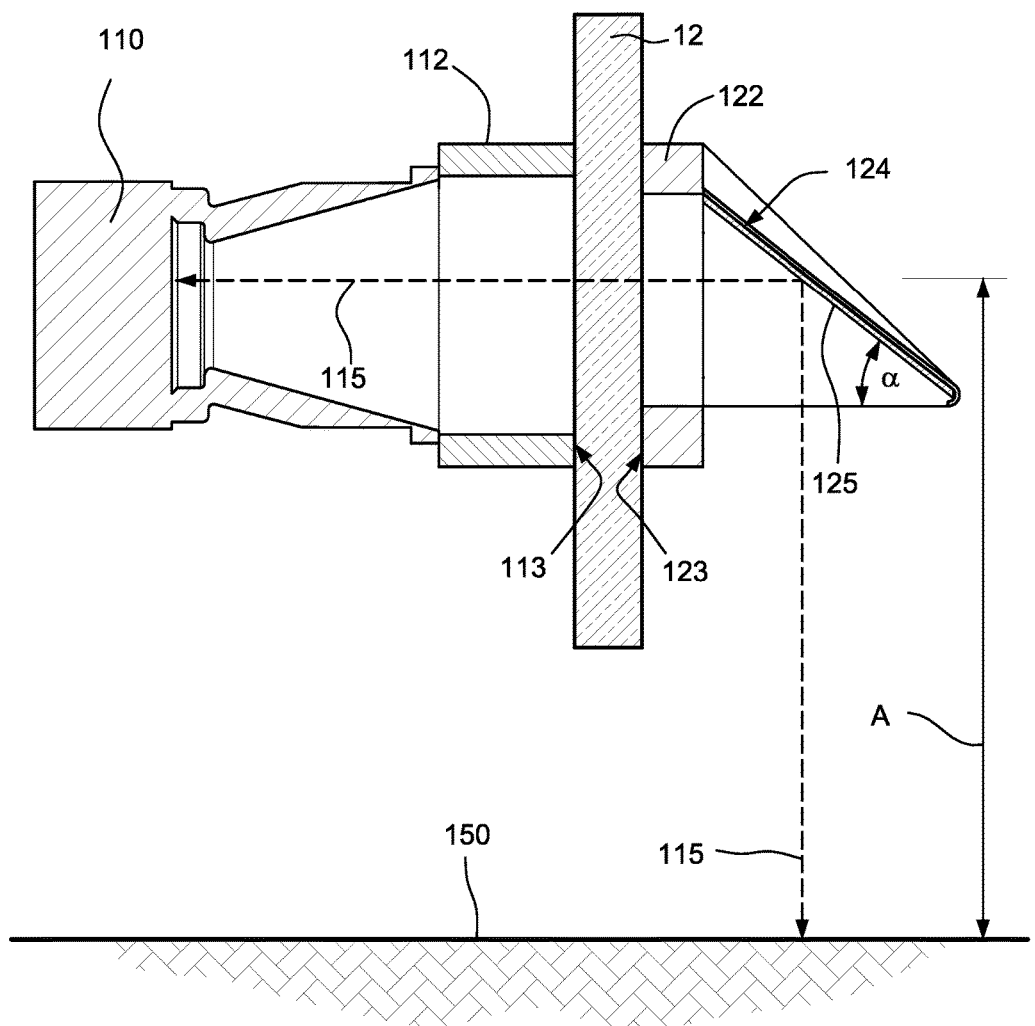
FIG. 4 is a cross-sectional view of the laser landing aid of FIG. 2.

Turning back to FIG. 2, laser landing aid 100 also includes a reflector module 120. Reflector module 120 includes a frame structure 126 having mounting structure 124 disposed therein, as shown in FIG. 4. Mounting structure 124 could be a wall of the reflector module, for example, to which a mirror 125 is attached. Instead of mirror 125, another reflecting material could be used (e.g., a reflective metal (could be used to deflect some energy waves (e.g., radio waves)), a prism, etc.).

Figure 5:
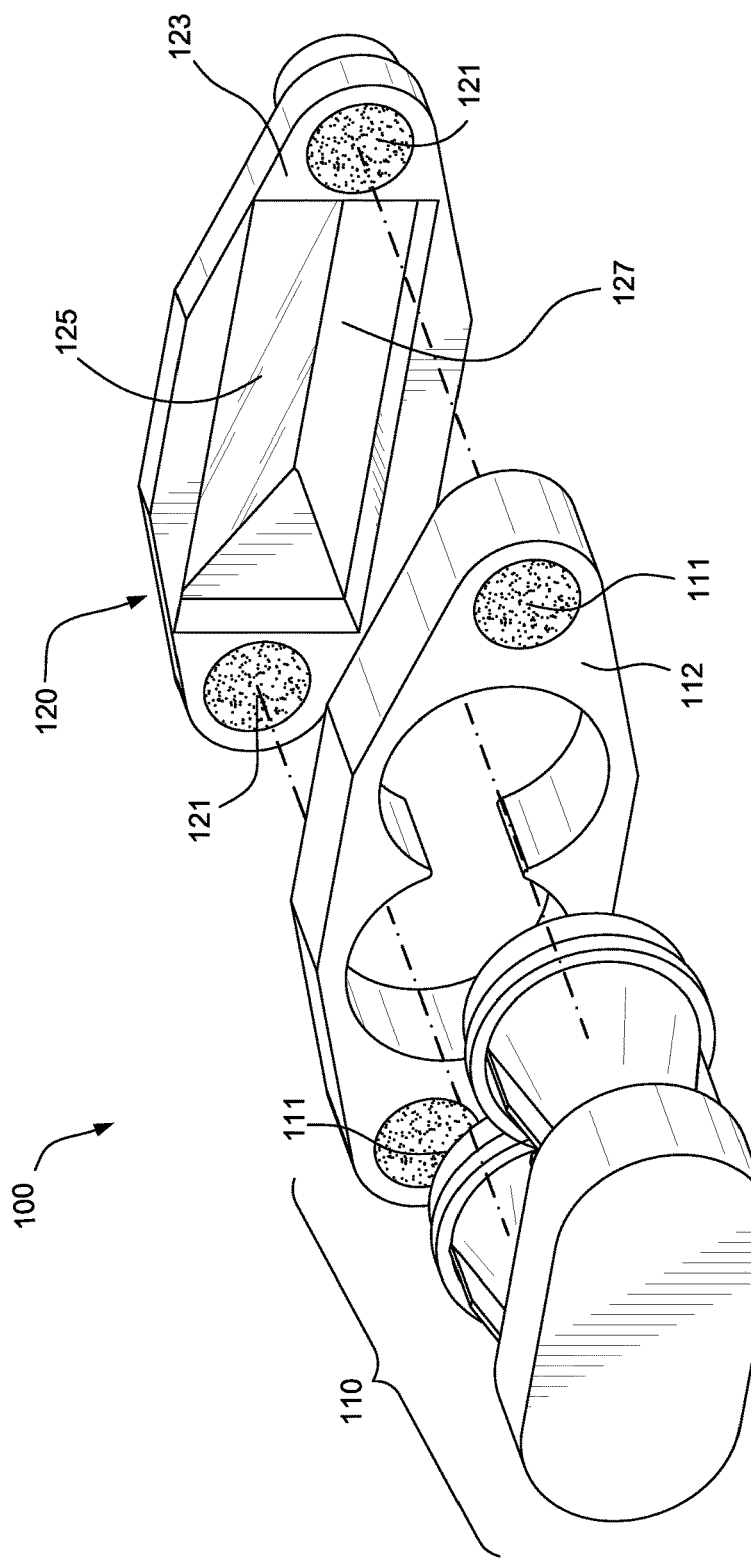
FIG. 5 is an exploded perspective view of an example laser landing aid.
Figure 6:
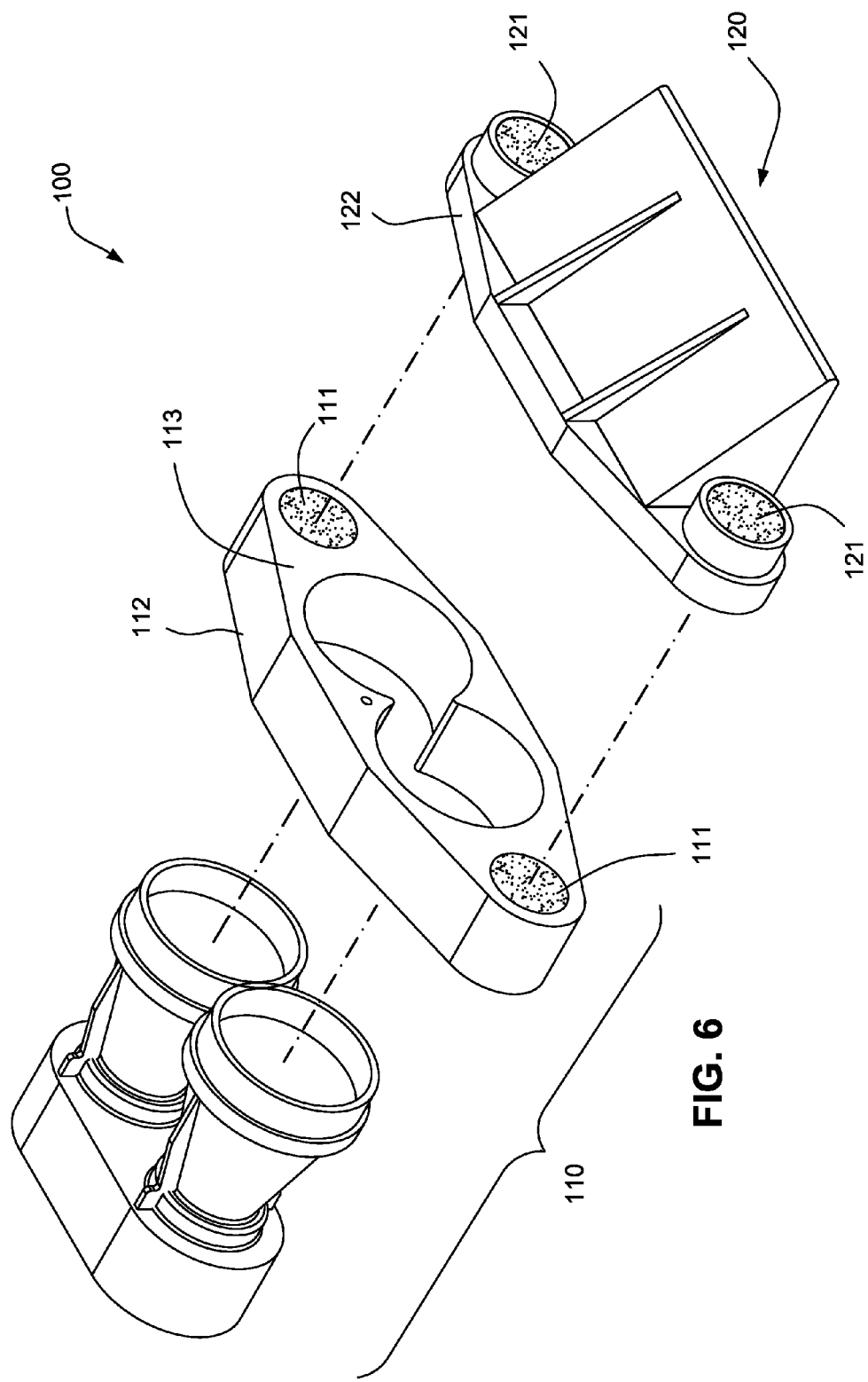
FIG. 6 is another exploded perspective view of the laser landing aid of FIG. 5.

Mirror 125 is disposed on an opposite side of window 12 and is aligned with the rangefinder so as to direct laser beam 115 toward the ground 150, through an open (or transparent) area 127 in frame structure 126, after the laser beam passes through the window, as best shown in FIGS. 4 and 5. That is, rangefinder 110 is disposed in an interior portion of aircraft 10, whereas reflector module 120 is disposed on an exterior portion of the aircraft. The interior portion of the aircraft includes the areas within the cockpit and cabin as well as other areas within the interior walls of the aircraft.

Still referring to FIG. 4, angle α of mirror 125 may be set (e.g., at 45°) by the position of mounting structure 124 so as to direct laser beam 115 approximately perpendicularly with respect to the ground (e.g., depending on the disposition of the aircraft window 12). Those skilled in the art will recognize that mounting structure 124 may be made adjustable so as to allow for the proper adjustment of angle α for the windows of various aircrafts. However, absolute perpendicularity is not required. It is, however, important that the beam direction be consistently maintained during a landing process. In this manner, a consistent measurement of the relative distance from the rangefinder 110 to the ground 150 can be made. For purposes of this application, the distance to ground (in relative terms, not necessarily in absolute terms of meters or feet) is referred to also as the altitude A of the aircraft, as shown in FIG. 4.

Rangefinder 110 and reflector module 120 may be removably attachable to window 12 so as to allow landing aid 100 to be used with more than one aircraft. In this manner, the landing aid may be retained when upgrading to a newer airplane. Additionally, the removable nature of the device may be particularly useful for student pilots and pilots with less than moderate experience.

In the illustrated example of FIG. 2, an interfacing portion 112 of rangefinder 110 engages an interior surface of window 12. Similarly, an interfacing portion 122 of reflector module 120 engages an exterior surface of window 12. As can be seen in FIGS. 2, 4 and 5, interfacing portion 112 and interfacing portion 122 have respective interfacing surfaces 113, 123 which engage opposite surfaces of window 12.

Rangefinder 110 may be secured to the inner surface of window 12 with an attachment device (e.g., strong magnet 111). Likewise, reflector module 120 may be secured to the outer surface of window 12 with an attachment device (e.g., complementary metal plate or another magnet 121). Magnets 111 on rangefinder 110 are aligned with magnets 121 on reflector module 120 such that the attraction of magnets 111 to magnets 121 pulls both the rangefinder and the reflector module securely into alignment and against opposite sides of the window. Those skilled in the art will recognize that any number of magnets may be used. Additionally, other attachment devices may be used (e.g., suction cups, adhesive, double-sided tape, screws, etc.).

In another example, rangefinder 110 may be situated within the interior of the aircraft to direct the laser beam toward the ground through a transparent bottom surface of the aircraft such that reflector module 120 is not needed. In another example, the bottom of the aircraft could be open. In yet another example, rangefinder 110 could be situated to direct laser beam 115 through a skylight where multiple reflectors may be positioned on exterior portions of the aircraft to direct the beam towards the ground.

Figure 8:
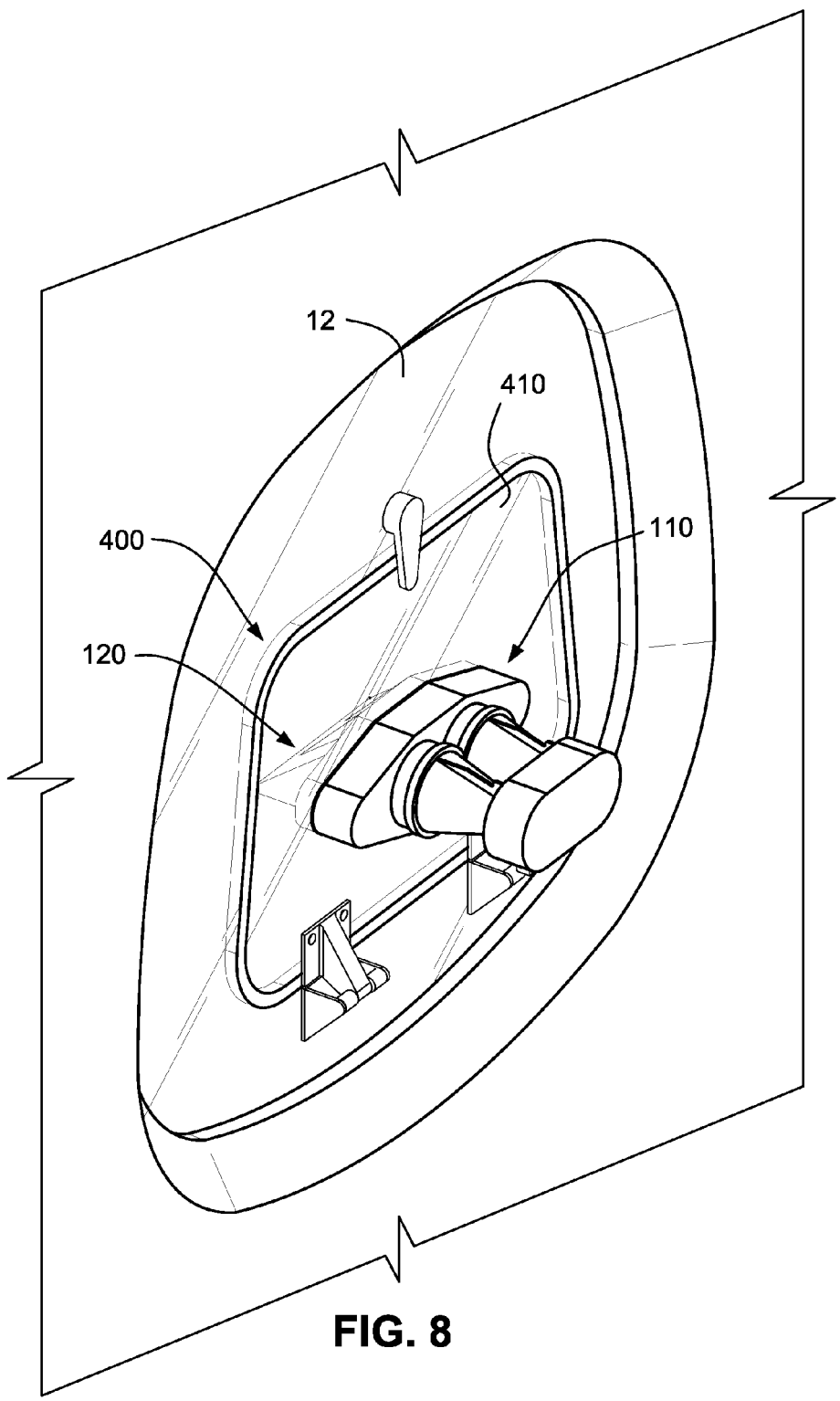
FIG. 8 is a partial perspective view of an aircraft window having a vent insert installed thereon according to an example of the disclosed technology.

In another example, rangefinder 110 and reflector module 120 could be attached to a vent window insert 400 that replaces the original vent window on the aircraft, as illustrated in FIG. 8. Vent window insert 400 may include a vent window 410 (e.g., made of Plexiglas®, or other plastic structure (transparent or opaque)). Rangefinder 110 and reflector module 120 may be permanently attached to opposite sides of vent window 410 such that the rangefinder, reflector module and vent window form a replaceable package. Additionally, rangefinder 110 and reflector module 120 may be attached directly to one another and the vent window may have a cutout to receive the rangefinder and reflector module as permanent attachments, as shown in FIG. 8. Further, instead of being separate components, rangefinder 110 and reflector module 120 could be formed as a single component extending through vent window 410.

In another example, rangefinder 110 (with or without reflector module 120 that could be eliminated if module 110 is directly pointed towards the ground) could be mounted on an exterior portion of the aircraft and communicate with a headphone interface (described below) via radio (e.g., Bluetooth), light beam or transformer induction. For example, rangefinder 110 (with reflector module 120 if desired) could be mounted to wing strut 18 (FIG. 1) or other structure, e.g., with an attachment member such as tie wraps, Velcro®, etc.

Turning back to FIG. 2, computerized control circuits of the rangefinder 110 are shown schematically as including at least one microprocessor (μP) 207 connected to execute computerized program code structures stored in memory 206 (e.g., possibly in conjunction with a suitable overarching operating system as those skilled in the art will appreciate). Of course, μP 207 also has access to any needed working memory 208. As those in the art will appreciate, elements 206, 207 and 208 may be provided on a single microprocessor circuit chip or an application-specific integrated circuit (ASIC). The rangefinder 110 including a built-in micro-processor system may be especially designed and built for this application or may be realized as a modified version of a commercially available rangefinder (e.g., with a modified micro-processor computer program controlling the rangefinder processes and outputs). Non-conventional aspects of the example rangefinder are described herein by providing flow chart descriptions of additional computer program functionality (e.g., see FIG. 7) that may be designed into the micro-processor system of a special purpose rangefinder or realized as a modified version of a conventional rangefinder.

Still referring to FIG. 2, a headphone interface 202 (comprising e.g., an audio interface circuit) is electrically connected to rangefinder 110 (e.g., via a multi-conductor cable). Headphone interface 202 may be connected to the aircraft's audio circuits (e.g., headphone/mic jack 204) via input/output (I/O) circuits 212 (e.g., the headset microphone connections could pass directly through I/O 212 while the headphone interface 202 is inserted between the aircraft and headset audio circuits). And, of course, the I/O circuit 212 may be incorporated within the headphone interface 202 itself. An audio transducer in the aircraft (e.g., a speaker or headset 210) may also be connected to an output port of headphone interface 202. In this manner, headphone interface 202 may inject audio signals into the aircraft's headset/speaker audio path in addition to audio signals (e.g., control tower audio) provided through the aircraft headphone/mic jack 204.

Headphone interface 202 may comprise a component box to house the audio interface circuit (e.g., audio amplifier, transformer, etc.). Headphone interface 202 may include a volume control input 214, batteries or connection to power source 218, and a power switch 216 to turn the device on and off. Headphone interface 202 may be configured to automatically shut off if headset 210 is unplugged from the output port.

Headphone interface 202 and rangefinder 110 may be battery-powered and configured to conserve energy for long battery life. The actual time of use during the last few moments of landing the aircraft are relatively short, so proper power management could provide for long battery life. The μP 207 in the rangefinder may be configured to conserve energy by turning off all components in the circuit and putting itself in sleep mode.

In sleep mode, μP 207 may run continuously at a relatively low speed and low power (e.g., drawing only a few μA). During flight, the μP would wake up periodically (e.g., every 10-20 seconds) to run rangefinder 110 briefly (e.g., 20 ms) to look for the ground. At cruising altitudes, the ground is typically too far away to be detected by the rangefinder. However, during landing, rangefinder 110 can detect the ground (e.g., from 20-75 feet).

If the ground is not detected, rangefinder 110 would go back to sleep mode. However, if the ground is detected and within a certain range (e.g., 40 feet or less), the device would remain in wake mode to provide landing guidance. After landing, the relative altitude A measurement by rangefinder 110 will equal a minimum value (or zero) (i.e., the nominal distance to the ground when the airplane is landed can be set as a zero relative altitude A). The device may wait a few seconds to re-check the altitude measurement. If confirmed, rangefinder 110 may return to sleep mode. The altitude measurement of zero would imply that the aircraft is on the ground and thus may trigger a longer sleep interval (e.g., 1 minute or more). Once the aircraft takes off again, the altitude measurement would be greater than zero (or the minimum value), outside a certain range (e.g., 40 feet) or return an out-of-range reading which would again trigger the shorter 10-20 second sleep interval.

Low vertical velocity at touchdown is critical to achieving a smooth landing. Thus, during the final moments of the landing process, access to precise measurements of distance to ground and descent rate conveyed to the pilot in real time is of great value. To prevent the pilot needing to look away from the flight path ahead, the landing aid conveys measurements of distance to ground and descent rate by sound (e.g., via headset 210 or aircraft speaker).

As mentioned above, headphone interface 202 is configured to inject audio signals into the headset audio path so as to produce sound via headset 210 superimposed with sound produced as a result of audio signals provided through aircraft headphone/mic jack 204 (see FIG. 2). Such audio signals, produced by rangefinder 110, may be configured to concurrently convey to the pilot measurements of descent rate and distance to ground.

Descent rate may be conveyed as the audible pulse rate of gated audio signals. For example, the rate at which the gated audio pulses occur may correspond to the rate of descent such that a high rate of descent would be conveyed by a fast pulse rate. The fast pulse rate may alert the pilot to slow the descent rate. A lower rate of descent would be conveyed by a slower pulse rate.

Distance to ground may be conveyed by pitch (frequency), i.e., the highness or lowness of an audio tone detectable during each gated audio pulse. For example, a two-tone system may be used. First, a reference tone having a pitch representing the touchdown altitude may be played. Then, a tone (altitude tone) having a pitch corresponding to the current distance to ground may be played. For example, during landing and before the aircraft touches down, the reference tone may have a relatively low pitch to represent the touchdown altitude and the current altitude tone may have a relatively higher pitch to represent the current distance to ground. As the distance to ground moves closer to the touchdown altitude, the difference in pitch between the reference tone and the altitude tone diminishes until the two tones are the same (or nearly the same) just prior to touchdown. And both tones, if desired, can be concurrently provided during each gated pulse of audio.

As those skilled in the art will understand, the pitch tones can be reversed in meaning such that a relatively high pitch may be used to represent the touchdown altitude, instead of a relatively low pitch. Then, relatively lower pitches may be used to represent the current altitude tone during a landing process.

But for non-musically inclined pilots it may be difficult to remember or judge certain frequencies. To address this issue, instead of using gated two-toned audio pulses to represent the rate of descent, this two-tone sequence may be itself alternated (or gated) at a rate corresponding to the rate of descent so as to also convey to the pilot a measurement of the rate of descent. In this manner, the repetition speed of the two-tone sequence may be configured to sound rushed or panicked when the rate of descent is relatively high so as to indicate urgency to the pilot.

Distance to ground and descent rate may also be conveyed to the pilot by synthetic voice. For example, number callouts such as "ten, nine, eight . . . " may convey distance to ground directly (e.g., in feet or meters). Additionally, information may be conveyed to the pilot by changing the pitch of the voice, the duration of the voice and/or the rate of speaking. For example, changing the pitch, duration of speaking or rate of speaking may indicate urgency (e.g., of high descent rate) or lack thereof. The rate at which number callouts occur could convey a measurement of the rate of descent.

The synthetic voice could also communicate other information, such as "battery low" and "ground detected at 18 feet." Also, the synthetic voice could provide a warning to check that the landing gear is down, e.g., "check gear down."

Figure 7:
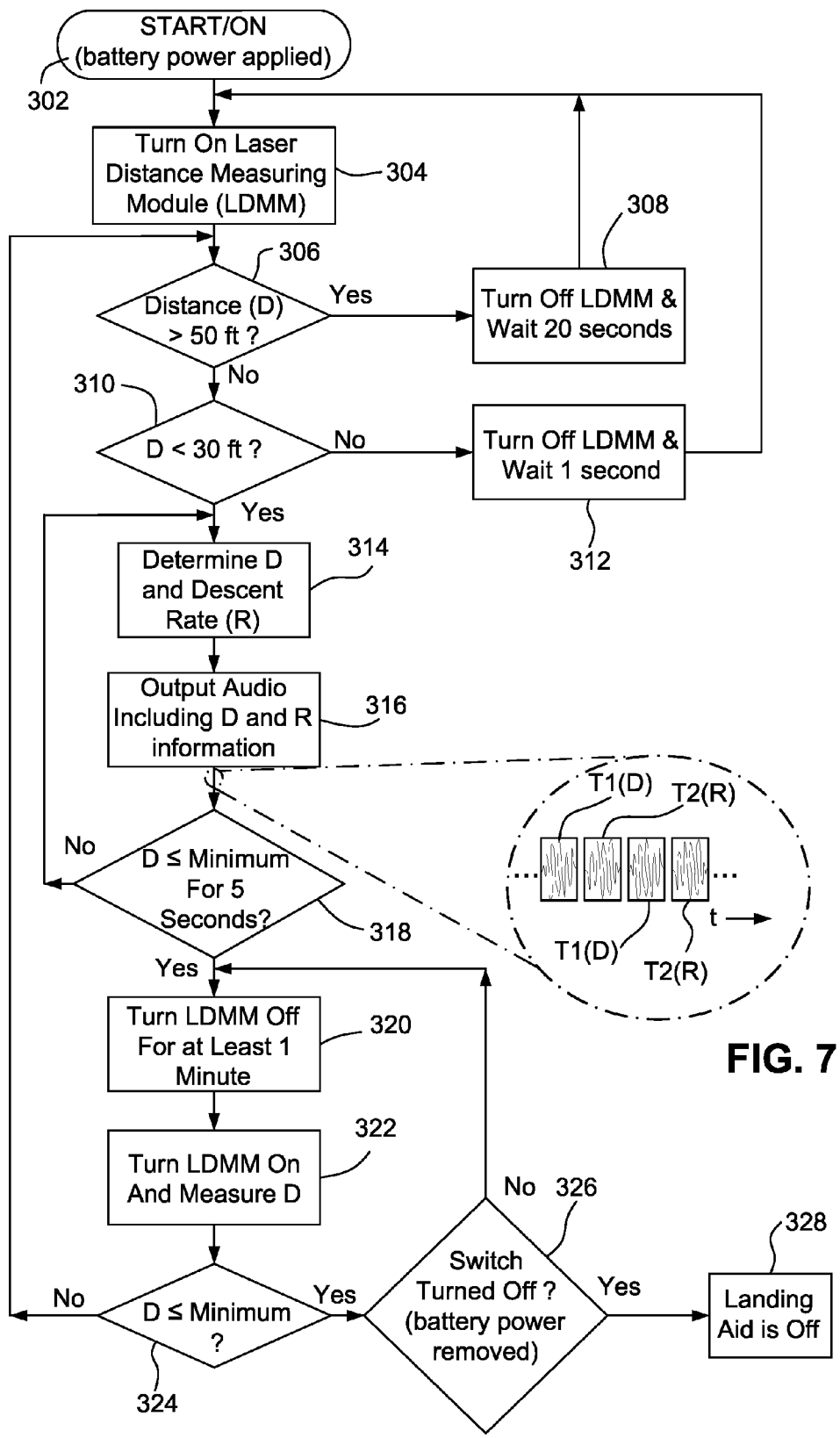
FIG. 7 is a functional block diagram representing an exemplary control program/process executed by a microprocessor of the laser landing aid of FIG. 2.

Turning to FIG. 7, a functional block diagram of an exemplary control process executed by the microprocessor is shown. At step 302, the control process is started and at step 304 the rangefinder is turned on (e.g., by turning switch 216 "on" thereby applying battery power from battery 218 to the rangefinder micro-processor and other rangefinder circuits). Next, at step 306, it is determined whether the distance to ground (D) is greater than 50 ft.

If it is determined that D is greater than 50 ft., it is assumed that a landing is not imminent, thus the rangefinder is turned off for 20 seconds, at step 308, then the process is started again at step 302.

On the other hand, if it is determined that D is not greater than 50 ft., the process continues to step 310, since the airplane is considered to be relatively close to the ground, where it is determined whether D is less than 30 ft. If D is not less than 30 ft., the rangefinder is turned off for only 1 second, at step 312, then the process is started again at step 302. However, if it is determined that D is less than 30 ft., it is assumed that a landing may be imminent, so the process continues to step 314 where D and descent rate (R) are determined. For example, at any given time t, the LDMM provides a measurement of D. The descent rate R can then be calculated as $$\frac{D(t2) - D(t1)}{t2 - t1}.$$

Based on the determinations of D and R, landing aid 100 outputs audio to the pilot including indications of D and R, at step 316. Here, gated audio tones T1(D) and T2(R) are output in a repeated pattern as depicted in FIG. 7. A sequence of stored numerical values can be read by the micro-processor from memory to produce a sequence of respectively corresponding output voltages along a waveform that defines one of several predetermined and/or controllable audio frequency tones (e.g., T1(D) and T2(R)). This process can then be stopped and started at controlled intervals to create pulses of audio output that define a controlled pulse-width modulated train of audio tone pulses. Alternatively, a tone T1(D) could be gated out at a pulse rate proportional to R. Also, additional tones (e.g., a reference tone T3(D)) could be output in accordance with the two tone system described above. Other arrangements of audio outputs to (e.g., concurrently) provide D and R data in accordance with the examples described above will be apparent to those in the art.

As those in the art will also realize, conventional voice synthesis circuits/computer programs may be configured to respond to the determined D and R information by outputting synthesized voiced words in a predetermined humanly recognizable language instead of pulsed audio tone signals to represent the determined D and R information. Thus, as explained above, the audio output could be realized by providing pilot audio output signals that include audibly distinct indications of (a) distance of the airplane from the ground and/or (b) descent rate of the airplane as it approaches a landing on the ground.

At step 318, it is determined whether D is less than or equal to a set minimum value for at least 5 seconds. When D is not less than or equal to the minimum value for at least 5 seconds, it is assumed that the landing process has not yet been completed, thus the process loops back to step 314 to determined D and R for outputting audio information to the pilot. However, when D is less than or equal to the minimum value for at least 5 seconds, it is assumed that the airplane is on the ground. Thus, the rangefinder is turned off for at least one minute, at step 320. After at least one minute has elapsed, the rangefinder is turned back on and D is measured, at step 322.

It is determined, at step 324, whether D is less than or equal to the minimum value. If D is not less than or equal to the minimum value, it is assumed that the airplane is no longer on the ground and that the airplane has taken off again; therefore, the process loops back to step 306 to start the process of determining when a landing is imminent.

However, when it is determined at step 324 that D is less than or equal to the minimum value, the process continues to step 326 where, if the power on/off switch 216 on the headphone interface is still turned "on", the process loops back to step 320 to periodically turn the rangefinder on to monitor D to determine when the airplane is again in flight.

However, if the power on/off switch 216 is turned off, the landing aid will remain off, as functionally indicated at 328, because now no battery power is being supplied to the rangefinder (or to the headphone interface circuit 202). And if the power on/off switch 216 is again turned "on", battery power is supplied to the rangefinder and headphone interface circuit to start the process again at step 302.

As those in the art will appreciate, the functionality of FIG. 7 may be realized by specially configured microprocessor computer programs and/or circuits. If a conventional rangefinder is utilized, then its normal output of digital signals (e.g., representing numbers defining a currently measured distance) could be further processed by modifying the micro-processor of the conventional rangefinder and/or by adding additional microprocessor system/circuits to accept the conventional rangefinder digital outputs as inputs to be processed in accordance with the functional diagram of FIG. 7 and thus provide the desired gated audio pulse outputs as described.

Figure 9:
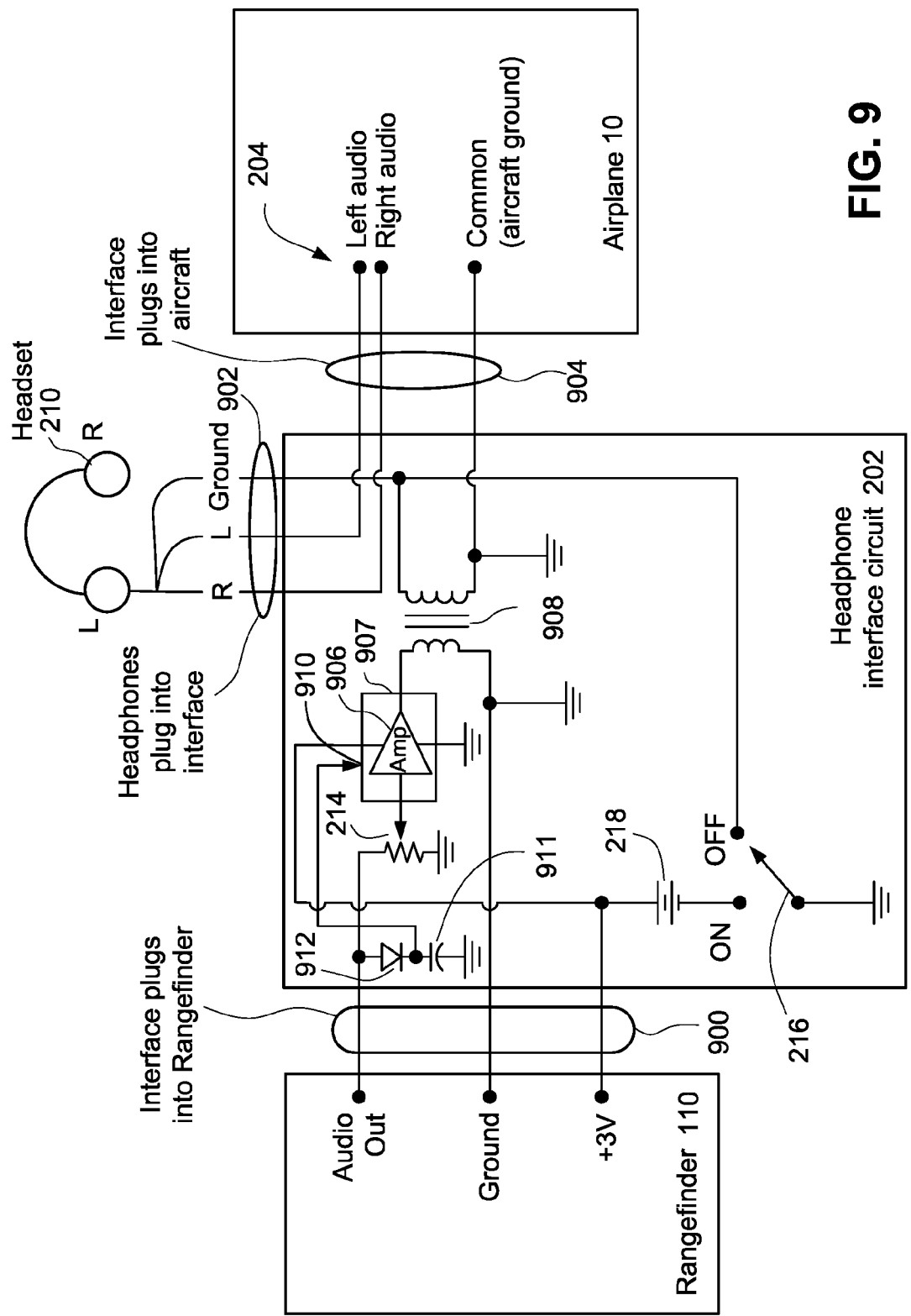
FIG. 9 is a schematic diagram of an example headphone audio interface circuit.

A simplified schematic diagram of an example headphone interface circuit 202 is shown in FIG. 9 including example interconnections with (a) rangefinder 110, (b) airplane 10 and (c) headset 210. In this example, the microphone circuits between headset 210 and airplane 10 have been omitted for simplicity. If desired, a separate I/O circuit 212 may be inserted between the aircraft, the headset and the headphone interface circuit to accommodate the microphone circuits, as shown in FIG. 2. Alternatively, such can simply be included as direct feed-throughs within the headphone interface circuit 202.

As depicted in FIG. 9, the headphone interface circuit 202 is connected via cabling 900, 902, 904 with rangefinder 110, headset 210 and airplane 10, respectively. Audio output from rangefinder 110 passes through volume control potentiometer 214 to the input of amplifier 906 which is powered by battery 218 if switch 216 is placed in the "on" position (as is the rangefinder 110). In the example, amplifier 906 is powered by a 3 volt battery which may produce relatively low magnitude and low impedance amplifier output. Accordingly, in this example, audio transformer 908 is employed to increase the audio circuit output voltage and impedance. For example, a transformer might be employed to provide an increase in output impedance from about 8Ω to about 250Ω. In the example embodiment amplifier 906 is realized within an IC chip 907 (e.g., TI TPA-2013) which has a "boost" or "shut-down" pin 910 connected to the rectified rangefinder audio output voltage on capacitor 911—which is rectified by diode 912. Thus when audio appears at the rangefinder audio output, a rectified version of that audio output appears across capacitor 911 to "turn on" amplifier 906 by applying voltage to its "boost" pin 910. Of course when audio output from rangefinder 110 disappears for a sufficient time period (determined by the effective time constant of the RC circuit including capacitor 911), the voltage to "boost" pin 910 disappears and amplifier 906 is, in effect, turned off.

As just noted, the example rangefinder 110 outputs a pulse width modulated audio signal that, when present, turns on amplifier 902 and, when not present, turns off amplifier 902. This arrangement also helps to conserve battery power.

Additionally, those skilled in the art will recognize that rangefinder 110 could simply provide measurement data to headphone interface circuit 202 and the headphone interface circuit could be modified to include micro-processor based circuits and programs configured to produce desired audio signals from a conventional rangefinder output (e.g., in accordance with the functionality of FIG. 7).

As will be appreciated by those in the art from the circuit diagram in FIG. 9, when switch 216 is in the "on" position, battery 218 is grounded and power is supplied to rangefinder 110 and to the headphone interface circuit 202. In this "on" mode, audio output from rangefinder 110 will be passed through volume control potentiometer 214 through amplifier 906 and audio transformer 908. And, because the circuits of headset 210 are now only grounded through audio output transformer 908, the audio output of rangefinder 110 is effectively superposed onto the left/right airplane audio output from airplane 10 and connected to the left/right audio transducers of headset 210.

When switch 216 is turned to the "off" position, the rangefinder 110 and headphone interface circuit 202 are no longer powered. However the headset 210 is still operative because now the ground connection of headset 210 is directly connected to ground (i.e., the indirect ground connection through the secondary winding of transformer 908 is now bypassed).

While the examples discussed above have been described in connection with what are presently considered to be practical and preferred features, it is to be understood that appended claims are intended to cover modifications and equivalent arrangements included within the spirit and scope of these examples.

What is claimed is:

1. An airplane landing aid comprising:
   a rangefinder configured for mounting in an aircraft interior, the rangefinder being configured to cause energy waves to propagate in a direction away from the rangefinder; and
   a reflector module configured for mounting on an aircraft exterior to deflect the energy waves from the rangefinder toward the ground and, subsequently, back to the rangefinder once reflected from the ground, wherein the rangefinder and the reflector module are configured for complementary mounting opposite each other on opposite sides of an airplane window.

2. The airplane landing aid as in claim 1, wherein:
   the rangefinder is configured to provide audio output signals representing distance from the ground and/or descent rate towards the ground and the airplane landing aid further comprises:
   an audio interface circuit electrically connected to an output of the rangefinder and being configured for connection to an audio transducer within hearing range of a pilot of the aircraft, said audio interface circuit being configured to provide to the pilot audio output signals that include audibly distinct indications of (a) distance of the airplane from the ground and/or (b) descent rate of the airplane as it approaches a landing on the ground.

3. The airplane landing aid as in claim 2, wherein said audibly distinct indications comprise synthetically voiced words in a predetermined language.

4. The airplane landing aid as in claim 3, wherein said synthetically voiced words are changed in pitch or duration or rate of speaking to indicate urgency or lack thereof as a function of measured airplane descent rate.

5. The airplane landing aid as in claim 2, wherein said audibly distinct indications comprise (a) pulsed audio emitted at an audible pulse rate that changes as a function of changes in measured airplane descent rate towards the ground and (b) at least one audible tone frequency that changes as a function of measured airplane distance from the ground.

6. The airplane landing aid as in claim 5, wherein said at least one audible tone frequency includes at least two tone frequencies, a first fixed reference tone frequency representing the airplane being landed and a second changing tone frequency representing the current measured airplane distance from the ground.

7. The airplane landing aid as in claim 6, wherein said at least two tone frequencies are alternately output in a two tone sequence at a repetition rate related to airplane descent rate.

8. The airplane landing aid as in claim 1, wherein the rangefinder and the reflector module each include magnets configured to attract correspondingly mated magnets in the opposite module through a window of the airplane whereby the rangefinder is attached to an inside surface of the airplane window and the reflector module is attached to an opposite exterior surface of the airplane window.

9. The airplane landing aid as in claim 2, wherein said audio interface circuit includes a battery-powered microprocessor circuit programmed to power the rangefinder "on" to generate landing aid outputs when measured distance from the ground is less than a predetermined amount.

10. The airplane landing aid as in claim 9, wherein said micro-processor circuit is further programmed to power the rangefinder "off" if measured distance from the ground is a sustained minimal amount.

11. The airplane landing aid as in claim 1, further comprising an audio interface circuit configured for connection between (a) the rangefinder, (b) pilot headphones and/or an airplane cockpit loudspeaker and (c) audio output circuits of the aircraft.

12. The airplane landing aid as in claim 11, wherein the audio interface circuit is configured to effect a switch-controlled ground connection to the pilot headphones and/or airplane cockpit loudspeaker (a) directly to ground potential or (b) indirectly to ground potential through a secondary winding of an audio output transformer.

13. An airplane landing aid comprising:
    a rangefinder configured for mounting in an aircraft interior;
    a reflector module configured for mounting on an aircraft exterior to deflect energy waves from the rangefinder; and
    an audio interface circuit being electrically connected to an output of the rangefinder and configured for connection to an audio transducer within hearing range of a pilot of the aircraft, said audio interface circuit being configured to provide to an aircraft pilot audio output signals that include audibly distinct indications of both (a) distance of the airplane from the ground and (b) descent rate of the airplane as it approaches a landing on the ground, wherein the rangefinder and the reflector module are configured for complementary mounting opposite each other on opposite sides of an airplane window.

14. The airplane landing aid as in claim 13, wherein said audibly distinct indications comprise synthetically voiced words in a predetermined language.

15. The airplane landing aid as in claim 14, wherein said synthetically voiced words are changed in pitch or duration or rate of speaking to indicate urgency or lack thereof as a function of measured airplane descent rate.

16. The airplane landing aid as in claim 13, wherein said audibly distinct indications comprise (a) pulsed audio emitted at an audible pulse rate that changes as a function of changes in measured airplane descent rate towards the ground and (b) at least one audible tone frequency that changes as a function of measured airplane distance from the ground.

17. The airplane landing aid as in claim 16, wherein said at least one audible tone frequency includes at least two tone frequencies, a first fixed reference tone frequency representing the airplane being landed and a second changing tone frequency representing the current measured airplane distance from the ground.

18. The airplane landing aid as in claim 17, wherein said at least two tone frequencies are alternately output in a two tone sequence at a repetition rate related to airplane descent rate.

19. The airplane landing aid as in claim 13, wherein the rangefinder is configured to cause the energy waves to propagate in a direction away from the rangefinder, and wherein the reflector module is configured to deflect the energy waves from the rangefinder toward the ground and, subsequently, back to the rangefinder once reflected from the ground.

20. The airplane landing aid as in claim 13, further comprising:
   an audio interface circuit configured for connection between (a) the rangefinder, (b) pilot headphones and/or an airplane cockpit loudspeaker and (c) audio output circuits of the aircraft;
   wherein the audio interface circuit is configured to effect a switch-controlled ground connection to a pilot headphone and/or an airplane cockpit loudspeaker (i) directly to ground potential or (ii) indirectly to ground potential through a secondary winding of an audio output transformer.

21. A rangefinder aided airplane landing method comprising:
   during an airplane landing process, detecting (a) distance of the airplane from the ground and (b) descent rate of the airplane toward the ground using a rangefinder mounted in an aircraft interior;
   generating audible signals within hearing range of a pilot of the airplane that include audibly distinct indications of both (a) distance of the aircraft from the ground and (b) the descent rate of the aircraft as the aircraft approaches a landing on the ground,
   wherein the step of detecting further comprises 1) propagating energy waves in a direction away from the rangefinder, and 2) deflecting the energy waves from the rangefinder toward the ground, with a reflector module mounted on the aircraft exterior, and, subsequently, back to the rangefinder once reflected from the ground, wherein the rangefinder and the reflector module are configured for complementary mounting opposite each other on opposite sides of an airplane window.

22. The rangefinder aided airplane landing method as in claim 21, wherein said audibly distinct indications comprise synthetically voiced words in a predetermined language.

23. The rangefinder aided airplane landing method as in claim 22, wherein said synthetically voiced words are changed in pitch or duration or rate of speaking to indicate urgency or lack thereof as a function of measured airplane descent rate.

24. The rangefinder aided airplane landing method as in claim 21, wherein said audibly distinct indications comprise (a) pulsed audio emitted at an audible pulse rate that changes as a function of changes in measured airplane descent rate towards the ground and (b) at least one audible tone frequency that changes as a function of measured airplane distance from the ground.

25. The rangefinder aided airplane landing method as in claim 24, wherein said at least one audible tone frequency includes at least two tone frequencies, a first fixed reference tone frequency representing the airplane being landed and a second changing tone frequency representing the current measured airplane distance from the ground.

26. The rangefinder aided airplane landing method as in claim 25, wherein said at least two tone frequencies are alternately output in a two tone sequence at a repetition rate related to airplane descent rate.

* * * * *